(12) United States Patent
Dunn et al.

(10) Patent No.: US 11,280,978 B2
(45) Date of Patent: Mar. 22, 2022

(54) METHODS OF ALIGNING A CYLINDRICAL LENS IN A LENS FIXTURE AND IN AN OPTICAL SYSTEM

(71) Applicant: CORNING INCORPORATED, Corning, NY (US)

(72) Inventors: Michael Morgan Dunn, Palmyra, NY (US); Kevin John Magierski, Victor, NY (US); Brian Monroe McMaster, Pittsford, NY (US); Paul Francis Michaloski, Rochester, NY (US); Duncan Christopher Spaulding, Fairport, NY (US)

(73) Assignee: Corning Incorporated, Corning, NY (US)

( * ) Notice: Subject to any disclaimer, the term of this patent is extended or adjusted under 35 U.S.C. 154(b) by 111 days.

(21) Appl. No.: 16/582,036

(22) Filed: Sep. 25, 2019

(65) Prior Publication Data
US 2020/0103612 A1    Apr. 2, 2020

Related U.S. Application Data

(60) Provisional application No. 62/739,611, filed on Oct. 1, 2018.

(51) Int. Cl.
*G02B 7/00* (2021.01)
*G02B 3/06* (2006.01)

(52) U.S. Cl.
CPC .............. *G02B 7/003* (2013.01); *G02B 3/06* (2013.01)

(58) Field of Classification Search
CPC ........... G02B 7/00; G02B 7/003; G02B 7/02; G02B 7/023; G02B 7/04; G02B 3/06;
(Continued)

(56) References Cited

U.S. PATENT DOCUMENTS 2,042,565 A    6/1936  Tillyer
2,573,056 A   10/1951  Polinske
(Continued)

FOREIGN PATENT DOCUMENTS

JP    08-234123 A    9/1996
JP    2004045701 A   2/2004

OTHER PUBLICATIONS

International Search Report and Written Opinion of the European International Searching Authority; PCT/US2019/053337; dated Dec. 19, 2019; 10 Pgs.

(Continued)

*Primary Examiner* — Jie Lei
(74) *Attorney, Agent, or Firm* — Kevin L. Bray

(57) ABSTRACT

The method of aligning a cylindrical lens in a lens assembly includes attaching the cylindrical lens to a lens fixture and interfacing the lens fixture to a support structure in which the cylindrical lens can be placed in a frontwards and backwards orientation. The method also includes capturing respective first and second line images of respective first and second focus lines as formed by the cylindrical lens in the forwards and backwards orientations. The method further includes establishing a relative orientation of the first and second line images and using the established relative orientation to determine an amount of angular misalignment of the cylindrical lens relative to a reference direction provided by the support structure. The method can include rotating the cylindrical lens relative to the lens fixture to reduce the amount of angular misalignment to be within an angular alignment tolerance.

17 Claims, 17 Drawing Sheets

(58) Field of Classification Search
CPC ...... G02B 26/124; G02B 6/42; G02B 6/4224; G02B 6/4236
USPC ....... 359/819, 823, 621, 623, 626, 710, 867, 359/383; 385/52, 33, 34; 356/399, 138, 356/140, 145
See application file for complete search history.

(56) References Cited

U.S. PATENT DOCUMENTS

| | | |
|---|---|---|
| 3,542,476 A | 11/1970 | Nord |
| 4,772,123 A | 9/1988 | Radner |
| 5,031,979 A | 7/1991 | Itabashi |
| 5,095,386 A | 3/1992 | Scheibengraber |
| 5,194,993 A | 3/1993 | Bedzyk |
| 5,270,850 A | 12/1993 | Mochizuki et al. |
| 5,301,004 A | 4/1994 | Percival et al. |
| 5,329,399 A | 7/1994 | Ho |
| 5,606,449 A | 2/1997 | Nishiyama |
| 5,888,841 A | 3/1999 | Synder |
| 5,999,251 A | 12/1999 | Teramoto et al. |
| 6,668,118 B2 * | 12/2003 | Matmon .............. G02B 6/32 356/154 |
| 6,717,745 B2 | 4/2004 | Nemes |
| 2018/0024311 A1 | 1/2018 | Kageyama |

OTHER PUBLICATIONS

Trioptics GmbH; "Centration Measurement, Lens Alignment, Cementing and Bonding of Lenses" 12 Pages; (2019.

* cited by examiner

METHODS OF ALIGNING A CYLINDRICAL LENS IN A LENS FIXTURE AND IN AN OPTICAL SYSTEM

This application claims the benefit of priority to U.S. Provisional Application Ser. No. 62/739,611 filed on Oct. 1, 2018, the content of which is relied upon and incorporated herein by reference in its entirety.

FIELD

The present disclosure relates to aligning optical elements, and in particular to methods of aligning a cylindrical lens in a lens fixture to form a lens assembly, and employing the lens assembly in an optical system.

BACKGROUND

Cylindrical lenses are refractive optical elements that have optical power in a first plane and no (or substantially less) optical power in a second plane orthogonal to the first plane. Cylindrical lenses are often used to form an image that extends mainly in one direction, e.g., light lines line focuses are formed at the focus of the cylindrical lens. This is because the optical power that acts only (or mainly) in the first plane compresses or expands the light in the orthogonal plane. Cylindrical lenses are also used to re-shape light beams emitted from light sources having an asymmetrical light emission pattern. Cylindrical lenses find use in autofocus systems from CD players to complex semiconductor inspection tools to scanning optical systems.

Because the optical power of a cylindrical lens is not rotationally symmetric, the cylindrical lens must be positioned in an optical assembly with a select rotational (azimuthal) orientation and to a select rotational (azimuthal) alignment tolerance. This contrasts with a spherical lens, which is nominally rotationally symmetric so that the rotational orientation does not substantially affect the imaging performance of the optical system in which the spherical lens resides.

For high-precision optical systems that include a cylindrical lens, the tolerance on the rotational orientation of a cylindrical lens may be very tight to ensure adequate optical performance. For a sufficiently long-radius cylindrical surface (i.e., where the optical power is relatively weak), standard contact-based measurements (e.g., mechanical probing) used to measure lens orientation are not sufficiently accurate. Indeed, many manufacturers of custom cylindrical lenses are unable to guarantee the rotational alignment of the cylindrical lens to a mechanical datum to relatively tight tolerances (e.g., 5 milliradians or even 3 milliradians or in some cases 2 milliradians or even 1 milliradian) associated with high-performance optical systems. Cylindrical lens alignment errors that exceed such tight tolerances can lead to significant optical performance issues for certain types of high-performance optical systems that utilize cylindrical lenses.

SUMMARY

An embodiment of the disclosure is directed to a method of forming a lens assembly. The method comprises: adjustably attaching a cylindrical lens to a lens fixture having an interface surface; interfacing the interface surface with a reference surface of a support structure, wherein the cylindrical lens can be placed in a frontwards and backwards orientation relative to a light beam, and wherein the reference surface defines a reference direction; for the frontwards and backwards orientations, capturing respective first and second line images of respective first and second focus lines as formed by the cylindrical lens; establishing a relative orientation of the first and second line images; using the established relative orientations of the first and second line images, determining an amount of angular misalignment of the cylindrical lens relative to the reference direction; and rotating the cylindrical lens relative to the lens fixture to reduce the amount of angular misalignment to be within a select angular alignment tolerance.

Another embodiment of the disclosure is directed to a method of measuring the rotational position of a cylindrical lens relative to a lens fixture to which the cylindrical lens is adjustable attached. The method comprises: interfacing the lens fixture with a reference feature in first and second measurement positions in which the cylindrical lens is respectively disposed in a frontward orientation and a backward orientation; for each of the first and second measurement positions, forming first and second line focuses and capturing first and second line images of the first and second line focuses, respectively; establishing a relative orientation of the first and second line images; and using the established relative orientation to determine the rotational position of the cylindrical lens relative to the lens fixture.

The alignment methods disclosed herein have advantages over existing alignment systems and methods.

A first advantage is that the methods are self-referencing, so that once the alignment of the cylindrical lens is established in the lens assembly, the lens assembly can then be added directly to an optical system in an aligned configuration.

A second advantage applies to cylindrical lenses that are relatively weak, e.g., have a focal length of 1500 mm or longer, or 2000 mm or longer or 2500 mm or longer. Such lenses have very little surface curvature and so are difficult to measure with sufficient accuracy using mechanical contact measurement techniques. In examples, the systems and methods disclosed herein can provide alignment to better than 1 milliradian.

A third advantage is that the measurement is non-contact so that there is no risk of damaging the optical surfaces of the cylindrical lens.

A fourth advantage is that cylindrical lenses with saggitta smaller than what can be reliably measured with a probing method are not a problem since the measurement relies on the refractive properties of the cylindrical lens being measured.

A fifth advantage is that the systems and methods enable an optical assembly manufacturer to specify a looser tolerance of the angular orientation of the cylindrical lens to a reference feature on the lens assembly. This in turn can reduce the cost of the optical assembly.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1A:
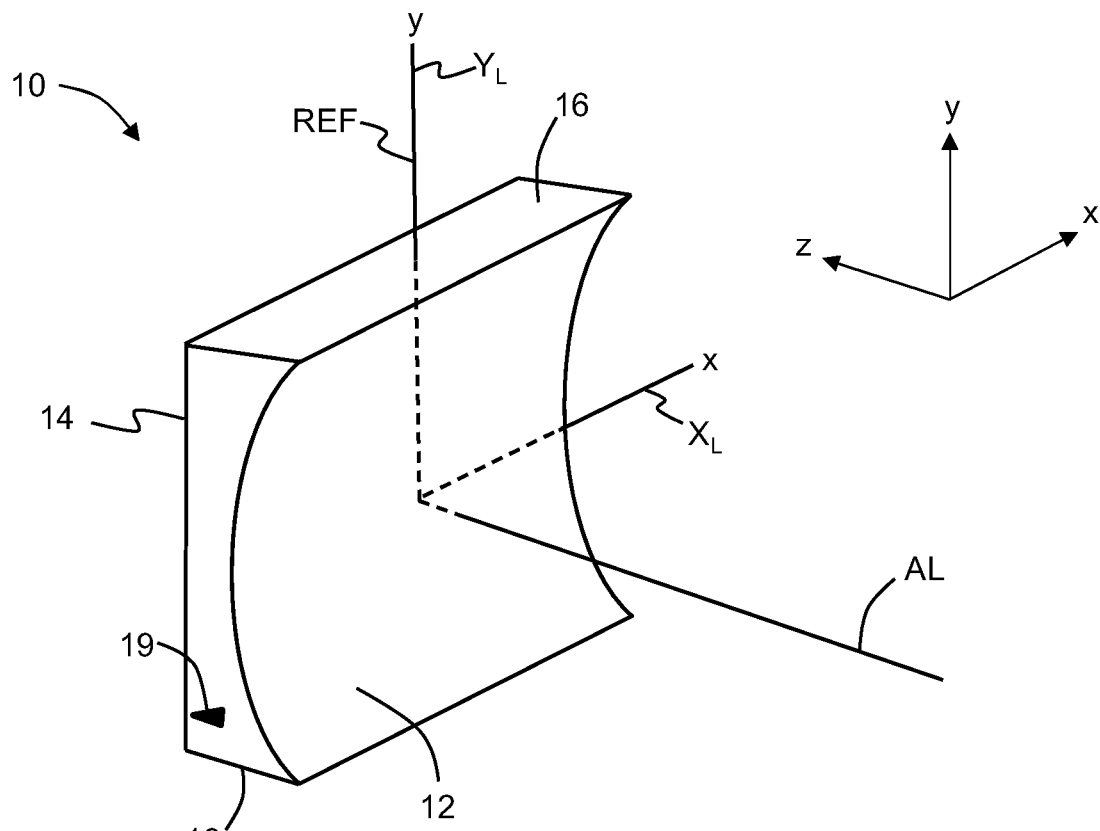
FIG. 1A is an elevated view and FIG. 1B is a side view of an example plano-concave lens wherein the cylindrical concave curvature is in the y-z plane.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation.

The terms vertical, horizontal, up, down, top, bottom, etc. are relative terms used for ease of explanation and for the sake of reference and are not intended to be limiting as to direct, orientation, position, etc.

The term "cylindrical lens" has at least one cylindrically shaped surface, and can also have a spherically shaped surface or any other type of shaped surface, in which case the cylindrical lens can be considered as a particular type or class of anamorphic lens. A cylindrical shaped surface can also have spherical shape within that surface forming a saddle-shaped surface. The cylindrical lens can be a single lens element or can comprise multiple lens elements or optical elements, that as a group comprise the cylindrical lens. Various types of cylindrical lens shapes can be used, such as plano-convex, plano-concave, positive meniscus, negative meniscus, etc. The curved surface shapes are not limited to spherical and can be aspherical. In the discussion below and in the Figures, the cylindrical lens is shown as a single lens element having a first cylindrical surface and a second planar (piano) surface for ease of explanation and illustration.

The term "focus line" is used to describe the real (i.e., not virtual) light distribution made by a cylindrical lens when it focuses collimated light, and is so is a real focus line as opposed to a virtual focus line.

The term "line image" is used to describe an image of a focus line as captured by an image sensor, embodied in an electrical (e.g., digital) image signal and optionally displayed on a display.

The term "precision surface" when applied to a planar surface means a surface that has a smooth surface finish and that has a high degree of planarity, such as can be achieved using precision finishing tools such as precision grinders, polishers, etc.

The acronym UV as used herein stands for "ultraviolet radiation."

The acronym CMOS stands for "complementary metal-oxide semiconductor."

The acronym CCD stands for 'charge-coupled device."

The terms "operable direction" and "operable orientation" are used to refer to one of the two general allowable positions of the cylindrical lens relative to a light beam for forming a line image. For a cylindrical lens having a front and a back surface and placed in a light beam formed by a light source, the operable directions or the operable orientations are defined as either when the front surface of the cylindrical lens faces away from the light source or faces toward the light source, with the cylindrical lens generally positioned at right angles to the central lens axis. Thus, the two operable directions of the cylindrical lens can be referred to as front and back orientations or frontwards and backwards orientations. In the methods discussed below, the direction or orientation of the cylindrical lens is flipped or reversed in the light beam from a frontwards to a backwards direction to establish two measurement conditions.

Cylindrical Lenses

FIG. 1A is a schematic diagram of an example cylindrical lens 10 to be secured to and aligned within a lens fixture as explained below. The cylindrical lens 10 is shown as a plano-concave lens by way of example and it will be understood that other types of cylindrical lenses can be employed in the systems and methods disclosed herein. The example cylindrical lens 10 has a cylindrically curved front surface 12, with the curvature residing in the y-z plane and a back surface 14 that is planar (plano). The cylindrical lens 10 has a central lens axis AL that passes through the center of the cylindrical lens and that runs in the z-direction. The cylindrical lens 10 has a top side 16 and a bottom side 18. The cylindrical lens 10 also has a vertical lens axis $Y_L$ and a horizontal lens axis $X_L$ that intersect at the central lens axis AL. The cylindrical lens 10 can also include one or more fiducials 19 that provide information about the cylindrical lens (e.g., which surface is the "front" or "back" surface) and that can also assist in positioning and aligning the cylindrical lens in the aforementioned lens fixture.

Figure 1B:
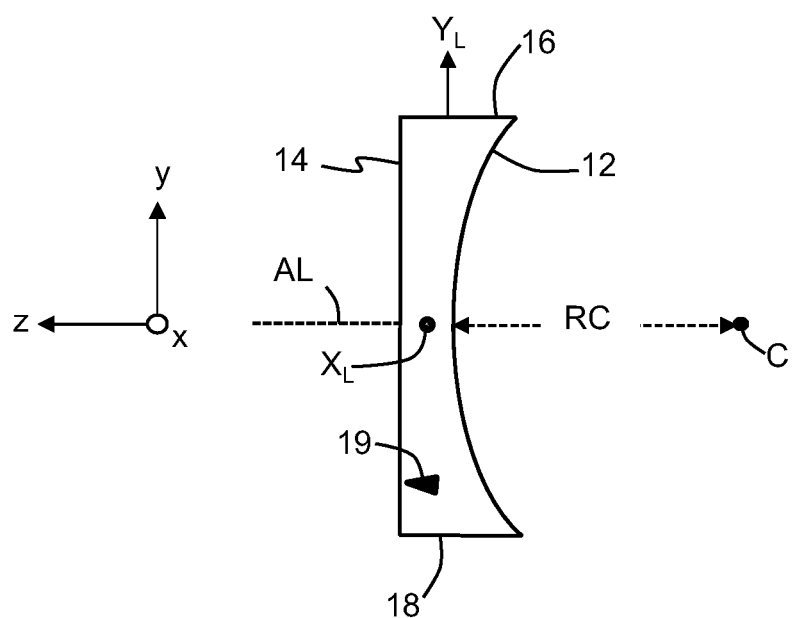

FIG. 1B is a side view of the example cylindrical lens 10 and shows a center of curvature C that defines a radius of curvature RC for the curved front surface 12. By convention, the direction of light travel is left to right and the concave front surface 12 has a negative radius of curvature RC since the center of curvature C is to the right of the cylindrical lens.

Figure 1C:
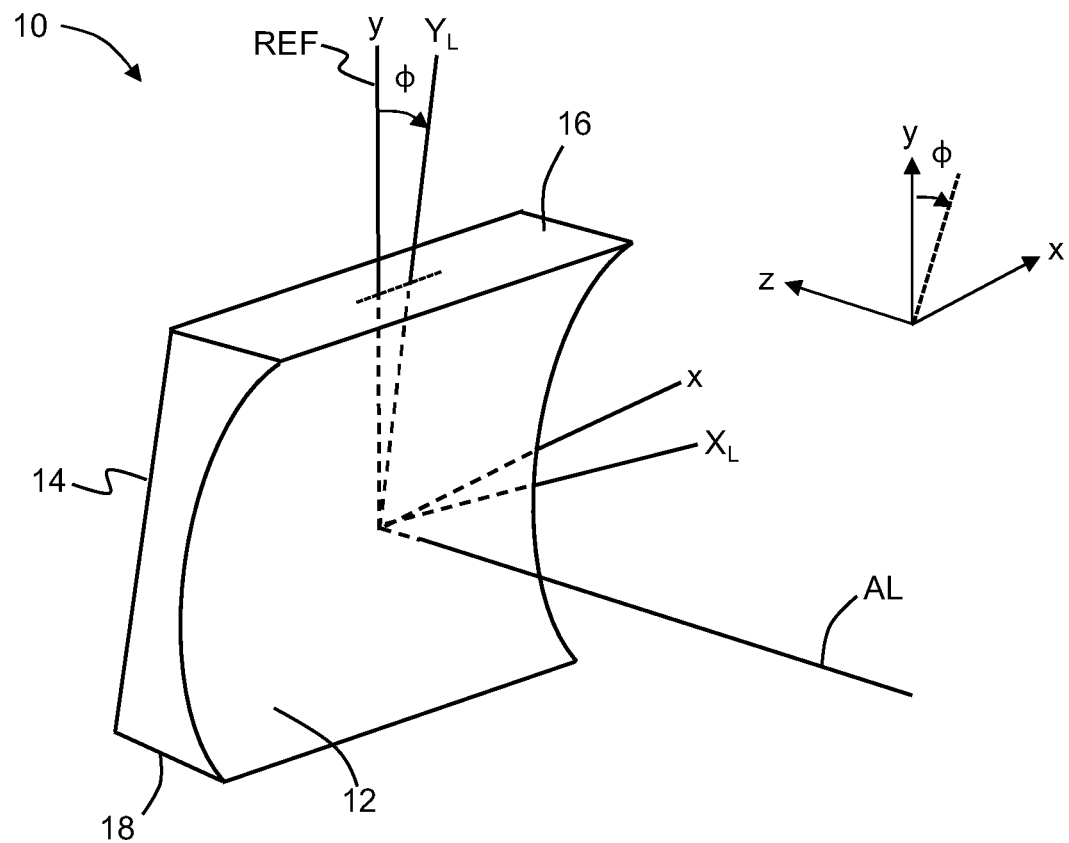
FIG. 1C is similar to FIG. 1A and illustrates the cylindrical lens rotated about the lens axis (LZ) by an amount $\phi$, which is the azimuthal angle as measured in the x-y plane relative to the reference y-direction.

FIG. 1C is similar to FIG. 1A and illustrates the cylindrical lens 10 rotated clockwise about the lens axis AL by an amount ϕ, which is the azimuthal rotation angle as measured in the x-y plane relative to the y-direction. The y-direction thus serves as a reference REF for measuring the azimuthal rotation of the cylindrical lens. A positive azimuthal angle ϕ between the y-direction (REF) and the vertical lens axis $Y_L$ is measured clockwise while a negative azimuthal angle ϕ is measured counter-clockwise. The azimuthal angle ϕ is also referred to below as the "rotational angle" or the "rotational position" or the "rotational misalignment."

Lens Fixture

Figure 2:
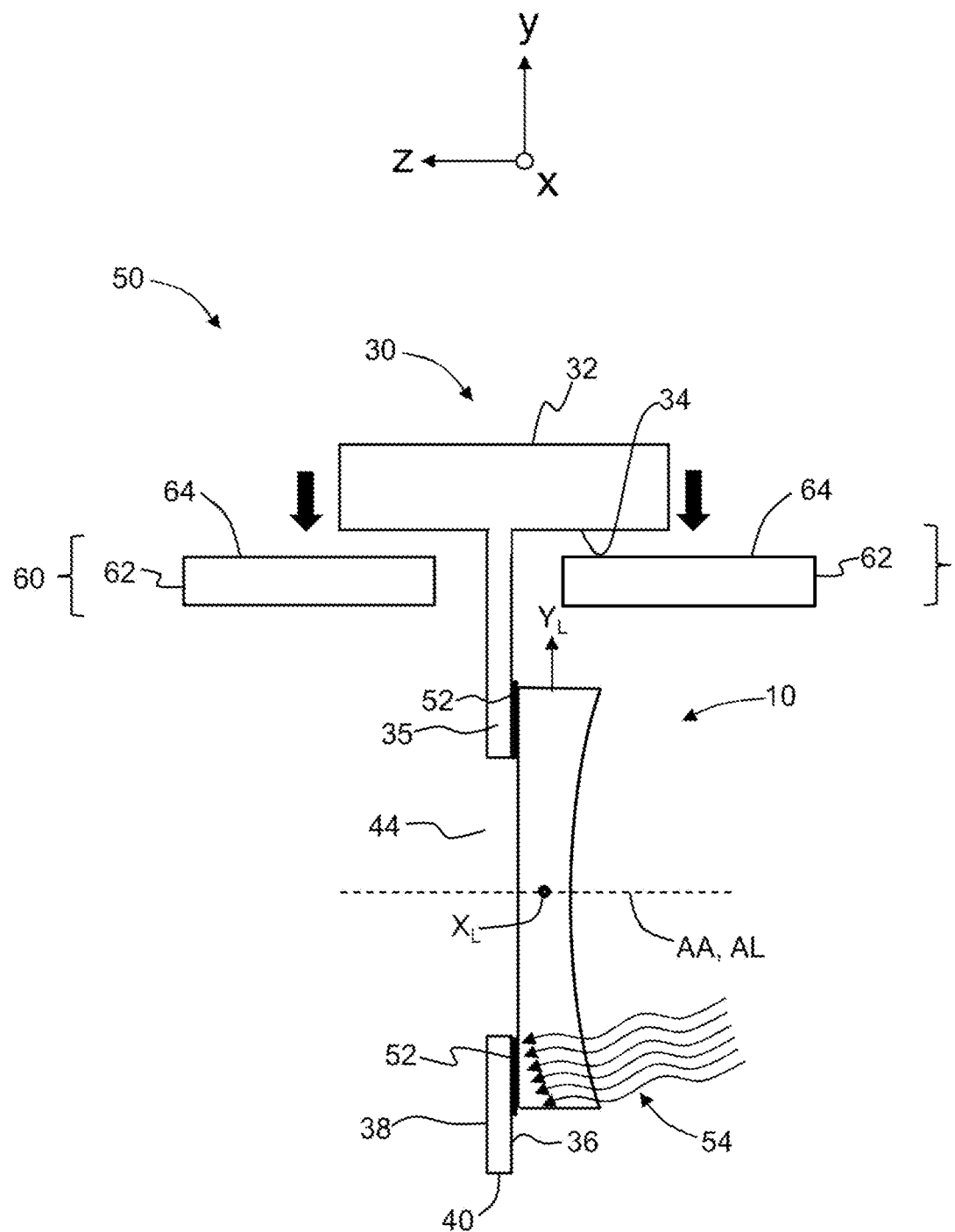
FIG. 2 is a side view of an example lens fixture used to operably support the cylindrical lens to form a lens assembly, and also showing an example support structure for the lens fixture that provides a mechanical reference datum for aligning the cylindrical lens within the lens fixture when forming the lens assembly.

FIG. 2 is a side view of an example lens fixture 30 used to operably support the cylindrical lens 10 to form a lens assembly 50. The example lens fixture 30 is T-shaped and includes a top section 32 and a downwardly depending mounting section 35. The top section 32 is generally planar and is oriented in an x-z plane. The top section 32 has an interface surface 34. The interface surface 34 is preferably formed as a precision surface since it is used to interface with another precision surface as explained below.

The mounting section 35 downwardly depends from the center of the interface surface 34 of the top section 32. The mounting section 35 has a front side 36, back side 38 and distal end 40. The mounting section 35 includes an aperture 44 having a central axis AA. The cylindrical lens 10 is mounted to the front side 36 of the mounting section 35 and over the aperture 44 so that the lens axis AL is substantially co-axial with the aperture central axis AA. The front and back sides 36 and 38 are preferably formed as precision surfaces. In an example, a securing material 52 is used to secure a portion of the back surface 14 of the lens 10 to the front surface 36 of the mounting section 35. In an example, the securing material 52 can comprise a curable adhesive, such as a UV-curable adhesive or a thermally curable adhesive. In an example, the rotational position of the cylindrical lens 10 is adjustable prior to curing the securing material 52 and is not rotationally adjustable after curing the securing material. In another example, set screws can be used to mount the cylindrical lens 10 to the mounting section using techniques known in the art.

FIG. 2 also shows an example support structure 60 having a support member 62 with a support surface 64. The support surface 64 is preferably formed as a precision surface since it receives and interfaces with the interface surface 34 of the lens fixture 30. The support surface 64 defines a mechanical reference feature (datum) when forming the lens assembly 50 as described below. In the example of FIG. 2, the support surface 64 resides in the x-z plane and further in an example defines the x-z plane.

Figure 3A:
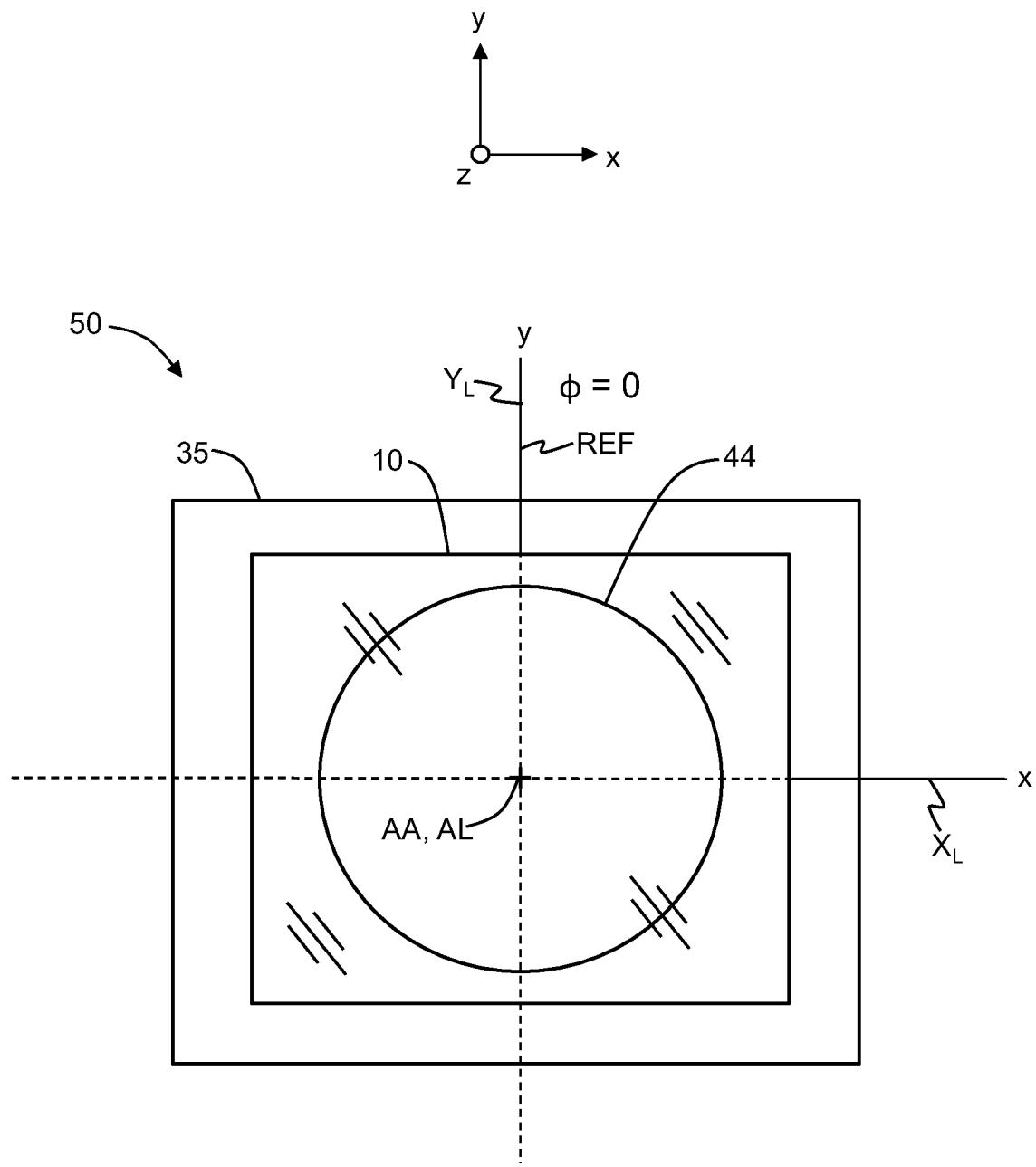
FIG. 3A is a front-on view of a portion of the lens assembly showing the cylindrical lens supported by the lens fixture in perfect rotational alignment, i.e., without any azimuthal rotation ($\phi$=0).

FIG. 3A is a front-on view of a portion of the lens assembly 50 showing the cylindrical lens 10 supported by the mounting section 35 of the lens fixture 30 in perfect rotational alignment, i.e., without any azimuthal rotation (ϕ=0). In this ideal alignment, the vertical lens axis $Y_L$ runs directly in the y-direction and the horizontal lens axis runs directly in the x-direction, noting again that the reference surface 64 resides in the x-z plane.

Figure 3B:
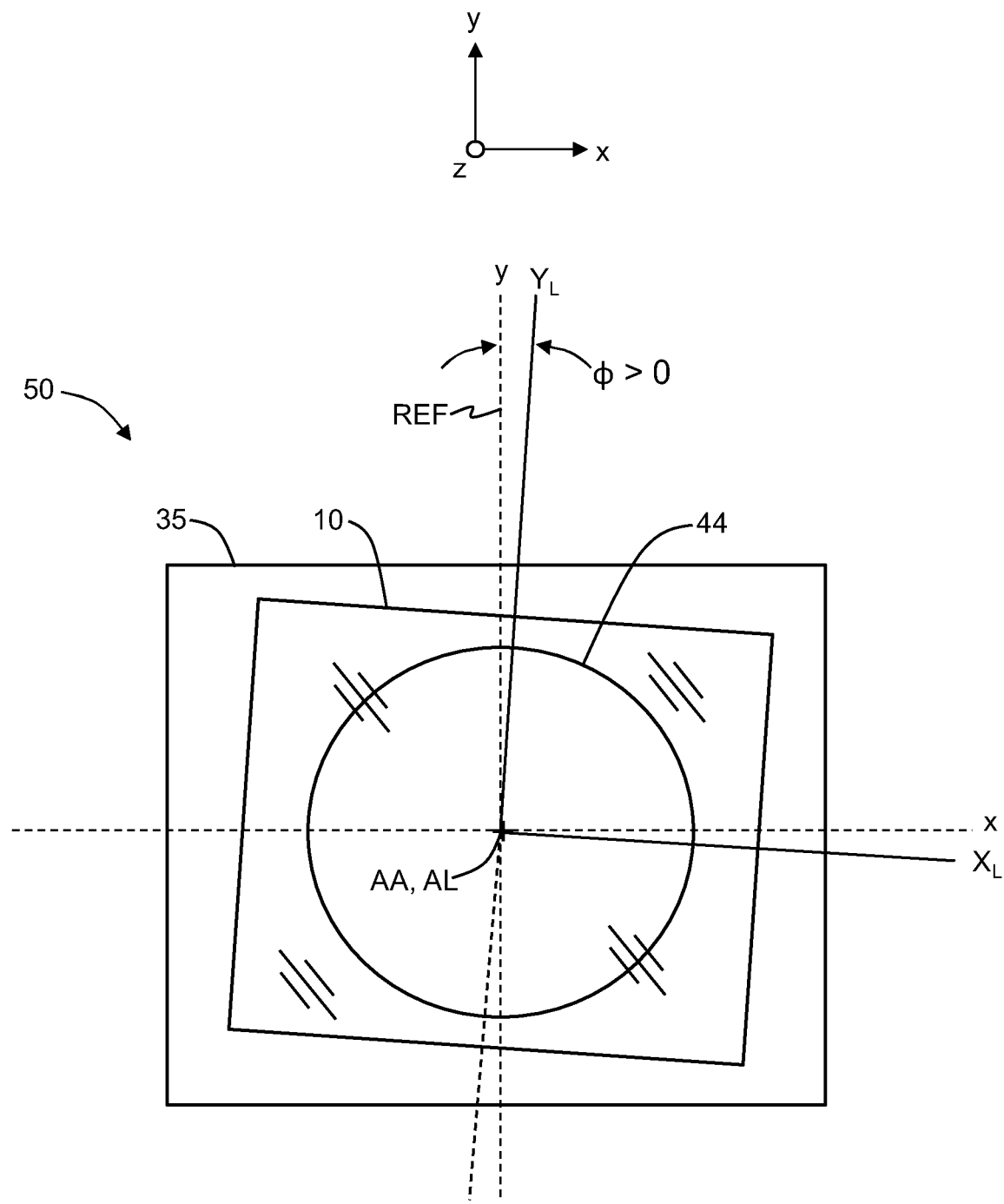
FIG. 3B is similar to FIG. 3A but shows the cylindrical lens having a rotational misalignment ($\phi\neq0$).

FIG. 3B is similar to FIG. 3A but shows the cylindrical lens 10 having an azimuthal rotation that constitutes an angular misalignment (ϕ≠0) of the cylindrical lens relative to the lens fixture 30.

Ideally, the cylindrical lens 10 is secured to the lens fixture 30 without any rotational alignment error, i.e., with ϕ=0, as shown in FIG. 3A. More practically, the goal is to secure the cylindrical lens 10 to the lens fixture 30 so that the angular misalignment (e.g., as expressed as the magnitude of the azimuthal angle |ϕ|) is within a tolerance T, e.g., |ϕ|<T. Here, T is the tolerance on the azimuthal rotational error (i.e., rotational alignment error) relative to the reference REF, or the y-axis of the reference coordinate system.

In various examples that depend upon the particular application, the tolerance T can be 5 milliradians or 4 milliradians or 3 milliradians or 2.5 milliradians or 2 milliradians or 1.5 milliradians or 1 milliradian.

Measurement Optical System

Figure 4A:
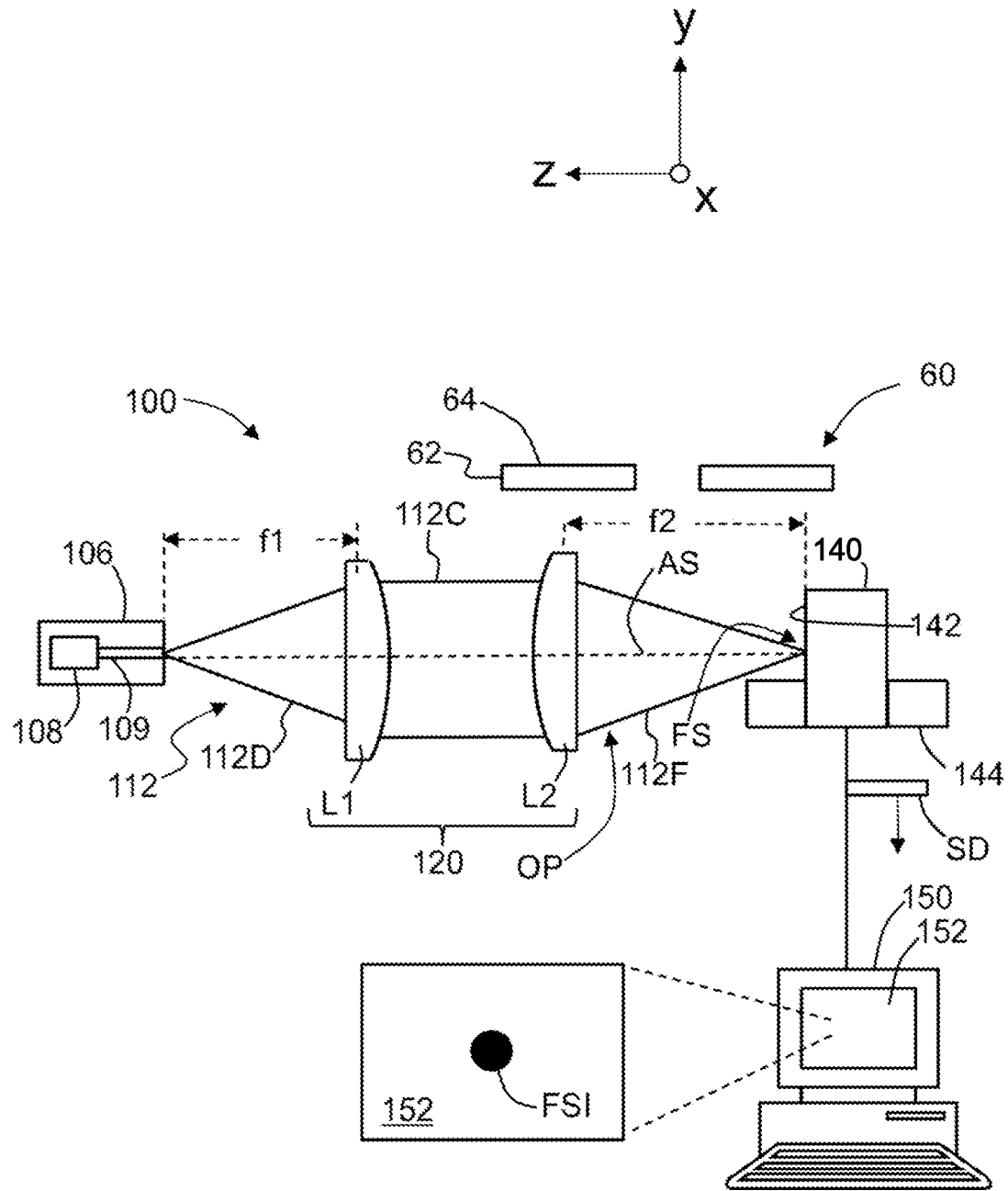
FIG. 4A is a schematic diagram of a measurement optical system used to measure the rotational orientation (position) of the cylindrical lens in the lens fixture relative to a mechanical measurement datum.

FIG. 4A is a schematic diagram of a measurement optical system ("system") 100 used to measure the alignment of the cylindrical lens 10 in the lens assembly 50, i.e., measure the azimuthal angle ϕ (rotational position) of the cylindrical lens 10 in the lens fixture 30 to assess whether |ϕ|<T.

The system 100 includes the support structure 60. As noted above, the support surface 64 resides in the x-z plane and defines a mechanical reference feature (datum). The system 100 has a system optical axis AS that runs in the z-direction and thus parallel to the support surface 64. The system has an optical path OP over which light 112 travels, as discussed below.

The system 100 includes a light source 106 and an optical system 120. The light source 106 can comprise a light emitter 108 optically coupled to a length of optical fiber 109. The light emitter can comprise a light-emitting diode (LED), a laser diode, or another type of laser source. The light source 106 can also consist of just the light emitter 108. The light source has an emitting end 110. In an example, the light source 106 emits from the emitting end 110 diverging light 112D along the system axis AS and towards the optical system 120.

The optical system 120 is rotationally symmetric and in an example is configured to collimate the diverging light to form collimated light beam 112C and then form from the collimated light focused (converging) light 112F. The optical system 120 can have a variety of different configurations as is known in the art, and the example configuration shown comprises first and second axially spaced apart positive refractive lenses L1 and L2 having respective focal lengths f1 and f2 by way of illustration. The focal lengths f1 and f2 can be the same (f1=f2) or different, as shown. The lens L1 is operably disposed a distance f1 from the emitting end 110 of the light source 106. The lens L1 comprises a collimating lens while the lens L2 comprises a relatively weak focusing lens. The lenses L1 and L2 can be individual lens elements, compound lenses, or lens assemblies comprising multiple lens elements. While the lenses L1 and L2 are shown schematically as refractive lens elements, it is known in the art that the optical system can comprise reflective lens elements or other types of lens elements or combinations of reflective and refractive lens elements.

In an example where the cylindrical lens 10 has positive optical power, the lens L2 can be a negative lens that converts the collimated light beam 112C into a weakly diverging light beam so that when the positive cylindrical lens 10 is inserted into the optical path OP, two line focuses are formed at different axial locations similar to as described below in connection with the negative cylindrical lens. Alternatively, the lens L2 can be omitted so that the positive cylindrical lens only forms a single line focus, as explained in the example embodiment shown in FIGS. 8A and 8B, introduced and discussed below. Note that in the particular embodiment of the system 100 shown in FIG. 4A, the converging light beam 112F is formed so that the otherwise virtual focus line of the negative cylindrical lens 10 becomes a real focus line. Generally speaking, it will be appreciated by one skilled in the art that the configuration of system 100 can be modified as needed to obtain a real focus line for the given configuration of the cylindrical lens 10.

With continuing reference to FIG. 4A, the system 10 also includes an image sensor 140 having an image-sensing surface 142, which is located a distance f2 from the second lens L2. The image sensor 140 can be supported by a movable stage 144 configured to adjust the axial position of the image sensor so that the image-sensing surface 142 can be used to detect images at different axial positions, as discussed below.

The image sensor 140 is operably connected to a controller 150, which includes a display 152. In an example, the image sensor 140 comprises CCD camera or CMOS sensor or like digital detector used to detect a spatial light distribution (i.e., an image) and convert the detected light into a digital image signal SD that is sent to the controller 150 for processing. In an example, the controller 150 comprises a computer configured to carry out instructions embodied in a non-transient computer-readable medium for processing the digital image signal SD from the image sensor 140 and to generally carry out aspects of the methods disclosed herein as described in greater detail below.

FIG. 4A shows a close-up inset view the display 152 of the controller. In the operation of the system 10 without the lens assembly 50 present, the divergent light 112D from the light source is collimated by the first lens L1 to form the collimated light beam 112C. The collimated light beam 112C is then focused by the second lens L2 to form the focused or converging light 112F. The focused light beam forms a focus spot FS at the image-sensing surface 142. The captured digital image of the focus spot FS is shown in the close-up inset view of the display 152 as the focus-spot (digital) image FSI.

Figure 4B:
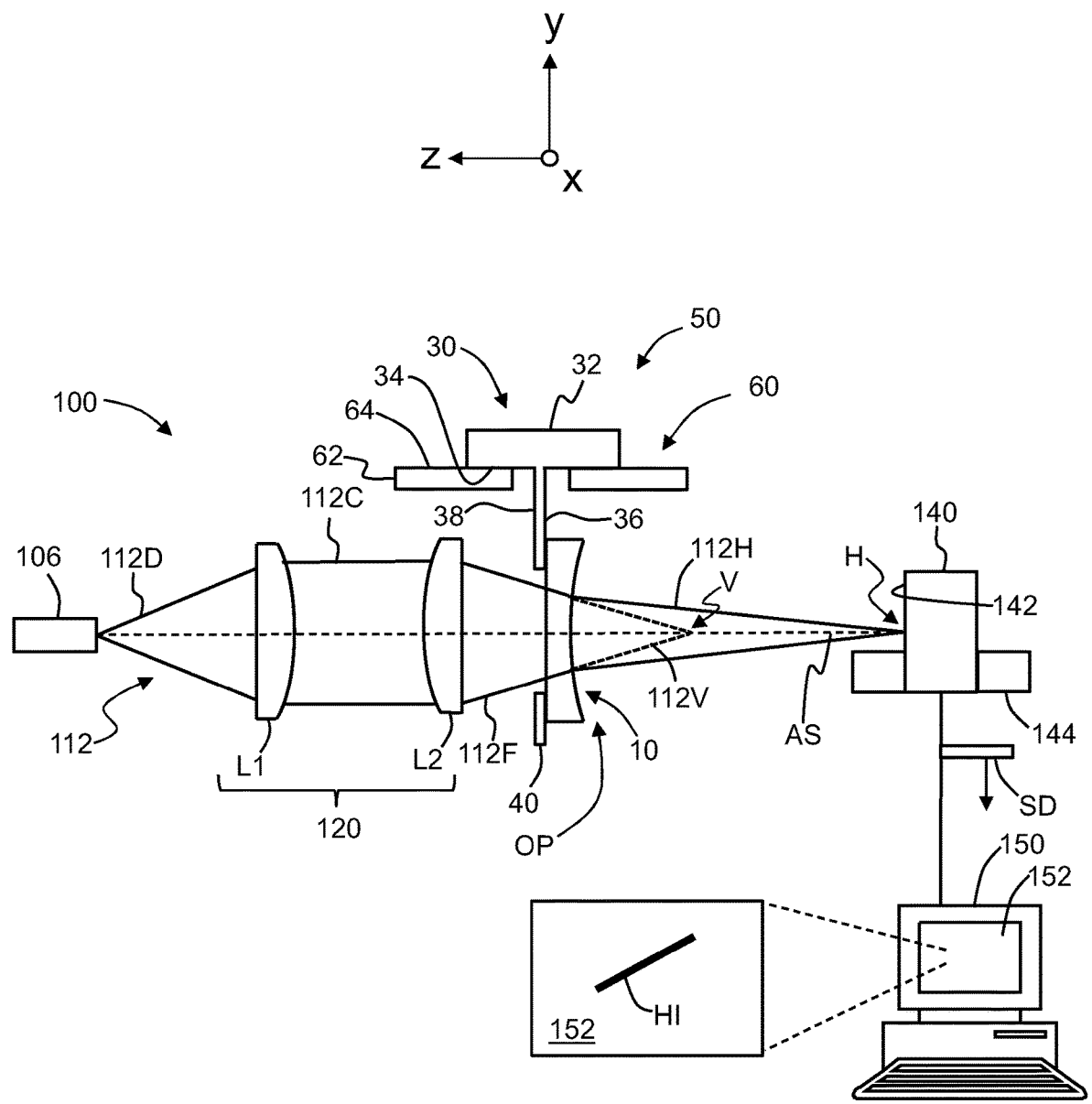
FIG. 4B is similar to FIG. 4A and shows the lens assembly operably disposed in the measurement system in a first operable orientation for measuring a first line image at one of the two line focuses.

FIG. 4B is similar to FIG. 4A and shows the system 10 with the lens assembly 50 operably disposed therein and operably supported by the support structure 60, with the interface surface 34 of the lens fixture 30 interfaced with the support surface 64 of the support structure. Note that the lens assembly 50 is disposed in the optical path OP of the focused light beam 112F with the front surface 12 of cylindrical lens 10 facing the image sensor 140. At this point, the cylindrical lens 10 can be said to be in a first operable direction or first operable orientation.

In this configuration, the cylindrical lens 10 forms from the focused light beam 112F a first focused light beam 112H, which in turn forms a first line focus H farther away from where the focus spot FS was formed due to the cylindrical lens 10 having negative power. Note that the first line focus H runs generally in the x-direction (horizontal) while the curvature of the front surface 12 of the cylindrical lens runs in the y-direction (vertical). Thus, the first line focus H is also called a horizontal line focus because it is oriented generally horizontally in the x-direction with only slight tilting from pure horizontal for relatively small angular misalignments of the vertical lens axis $Y_L$ of the cylindrical lens 10 relative to the (reference) y-axis.

The remaining portion of the focused light beam 112V is not subjected to the optical power of the cylindrical lens 10 and is shown as a dashed line and forms a second or vertical line focus V where the original focus spot FS was formed in the absence of the cylindrical lens (see FIG. 4A). The vertical line focus V runs generally in the y-direction, i.e., orthogonal to the direction of the horizontal line focus H, with only slight tilting from pure vertical for relatively angular misalignments.

The close-up inset view of the display 152 shows a captured (digital) horizontal line image HI of the horizontal line focus H as captured by the image sensor 140 and sent to the controller 150.

Figure 4C:
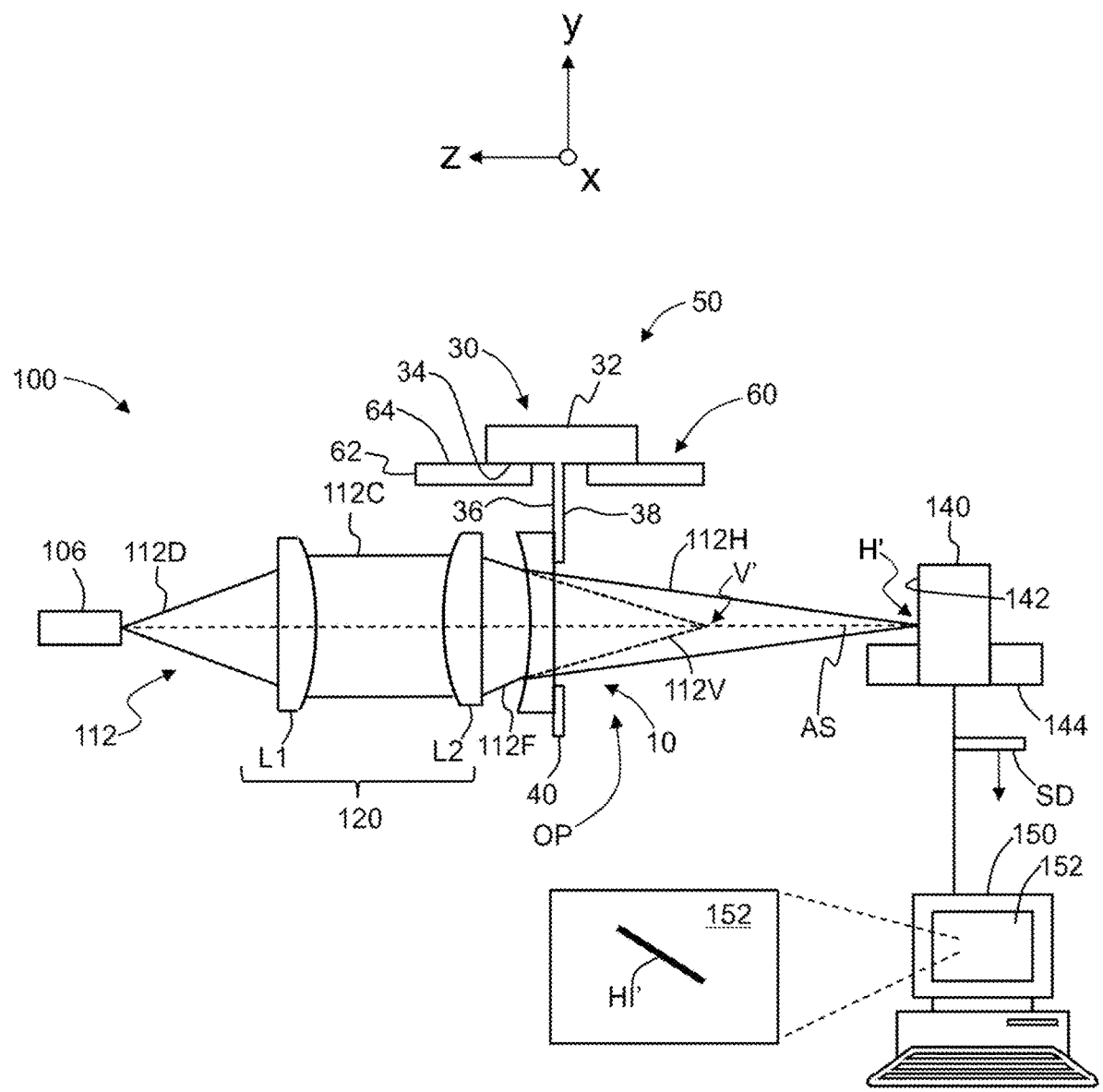
FIG. 4C is similar to FIG. 4B but shows the lens assembly in a second operable orientation opposite the first operable orientation for measuring a second line image at the same line focus used in the forward orientation of FIG. 4B.

FIG. 4C is similar to FIG. 4B, except that the lens assembly 50 is flipped around so that the cylindrical lens 10 is in the second operable direction or orientation, with its front surface 12 now facing the light source 106 (i.e., the cylindrical lens is now "backwards"). The resulting line focuses are denoted H' and V' to differentiate from those associated with the measurement configuration of FIG. 4A. The image sensor 140 may need to be moved (e.g., via movable stage 144) to accommodate for any change in location of the axial position where the horizontal line focus H' is formed. The close-up inset view of FIG. 4C shows the captured second horizontal line image HI', which is rotated relative to the captured horizontal line image HI shown in FIG. 4B.

Figure 5A:
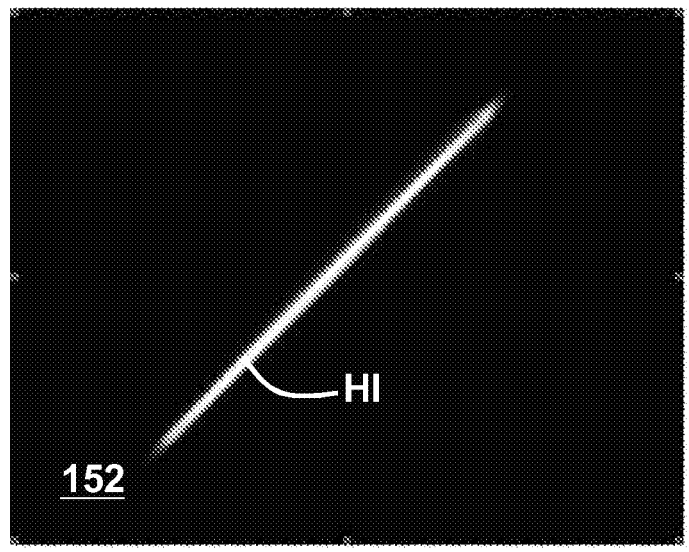
FIGS. 5A and 5B are actual first and second line images as respectively captured by the image sensor of the measurement optical system.
Figure 5B:
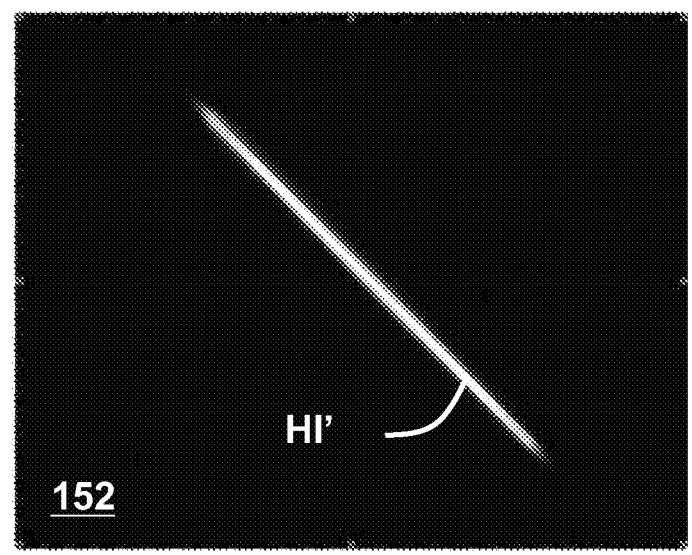

FIGS. 5A and 5B depict actual captured horizontal line images HI and HI' from the image sensor 140 for a relatively large amount of angular misalignment of the cylindrical lens.

Figure 6A:
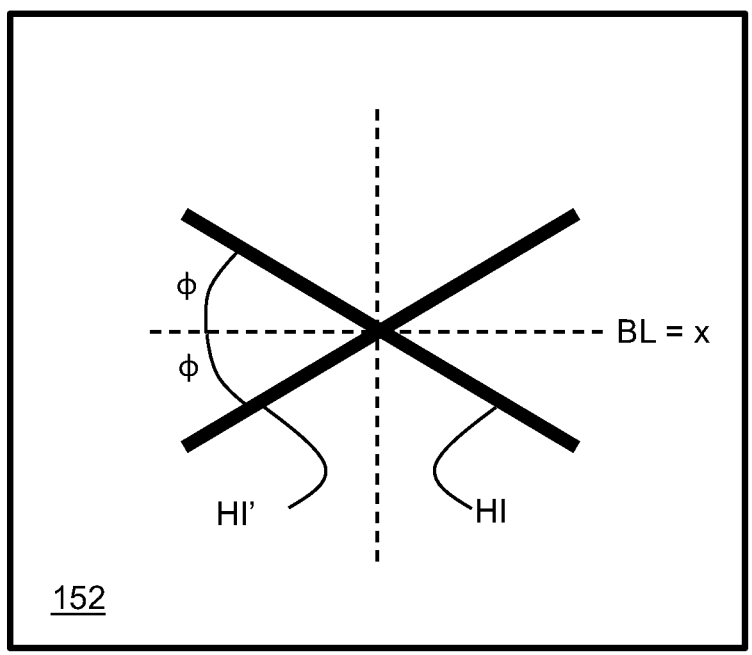
FIG. 6A is a schematic depiction of first line images at the first focus positions for the two measurement configurations as captured by the image sensor of the measurement optical system and illustrating how the controller determines a reference feature in the form of a bisecting line that corresponds to the x-axis of the reference coordinate system.

FIG. 6A is a schematic depiction of the display 152 showing the two captured second line images HI and HI' as captured for the respective configurations of the system 10 of FIGS. 4A and 4C. In a lens assembly 50 where the cylindrical lens 10 is perfectly aligned, i.e., as having no azimuthal rotation so that $\phi=0$, the line focuses H and H' have the same orientation, i.e., are co-linear and run in the x-direction. The relative tilting between the line images HI and HI' is caused by rotational misalignment $\phi$ of the cylindrical lens 10. A bisecting line BL that bisects the two first line images H and H' is shown as a dashed line. The bisecting line BL is determined by the controller 150 corresponds to the x-axis of the reference coordinate system. The bisecting line BL thus serves as a convenient reference for establishing the relative orientations of the two horizontal line images HI and HI' and thus the azimuthal rotation angle $\phi$, i.e., the rotational misalignment of the cylindrical lens 10. In an example, the controller 150 need not expressly calculate the bisecting line BL to establish the relative orientations of the two line images HI and HI' (or VI and VI').

If the amount of azimuthal rotation φ is within the select tolerance, the cylindrical lens 10 can be fixed in position, e.g., by irradiating the UV-curable adhesive 52 with UV radiation 54 through the cylindrical lens (see FIG. 2), by securing set screws, etc., so that the cylindrical lens can no longer rotate relative to the lens fixture 30.

If the amount of azimuthal rotation φ is beyond the select tolerance, then the rotational position of the cylindrical lens 10 is adjusted to fall within the select tolerance and then secured in position. Example methods of adjusting the relative position of the cylindrical lens 10 are discussed below.

Figure 6B:
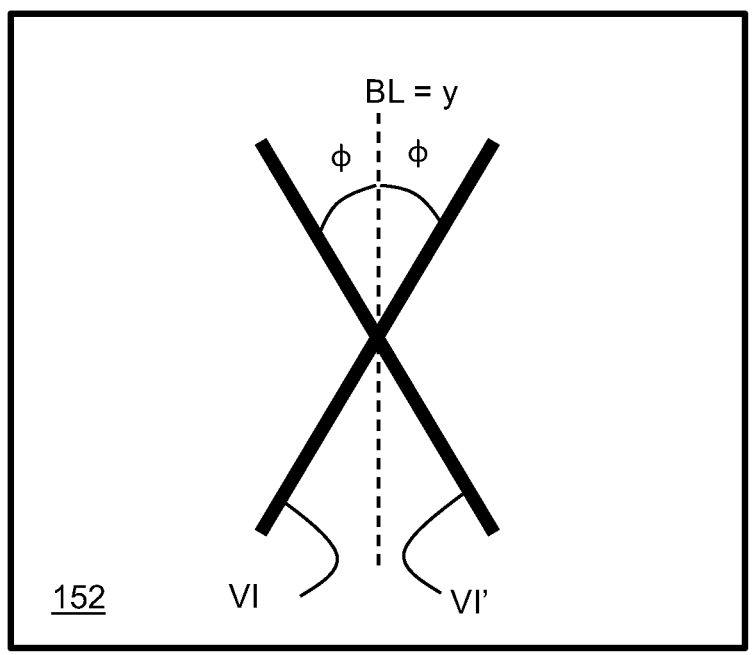
FIG. 6B is similar to FIG. 6A but shows the second line images at the second focus positions for the two measurement configurations.

It is noted here that in the alternative, the vertical line focuses V and V' for the two operably orientations of the lens assembly 50 can be captured by adjusting the axial position of the image sensor 40 using the movable stage 44. The corresponding vertical line images VI and VI' would then be used to measure and adjust the angular alignment of the cylindrical lens 10, as shown in FIG. 6B. In this case, the bisecting line BL runs in the y-direction and so serves as a reference. The azimuthal rotation φ is then measured with respect to this bisecting line BL.

It is noted that the scale of the azimuthal rotation angles φ in FIGS. 6A and 6B is greatly exaggerated. The typical rotational errors φ are on the order of ten milliradians or less, which are relatively hard to see using the naked eye. Thus, an aspect of the disclosure includes having the controller 150 perform the calculations that are used to establish the relative orientation of the line images HI and HI' (or VI and VI'). As noted above, this can be done by determining the bisecting line BL.

Establishing the relative orientations of the line images HI and HI' (or VI and VI') can include the controller first establishing best fits to the given pairs of line images (e.g., either the horizontal line images HI and HI' or the vertical line images VI and VI') and then using the numerical best-fit line images. The controller can also use the best-fit images to determine the bisecting line. The controller can then determine the rotational misalignment once the relative orientation of the line images is established.

In an example, both the horizontal line images HI and HI' and the vertical line images VI and VI' can be measured and an amount of angular misalignment measured for each pair of line images. The results of the two measurements can then be averaged to obtain an averaged measurement of the angular misalignment.

Example Adjustable Lens Fixture and Lens Assembly

Figure 7:
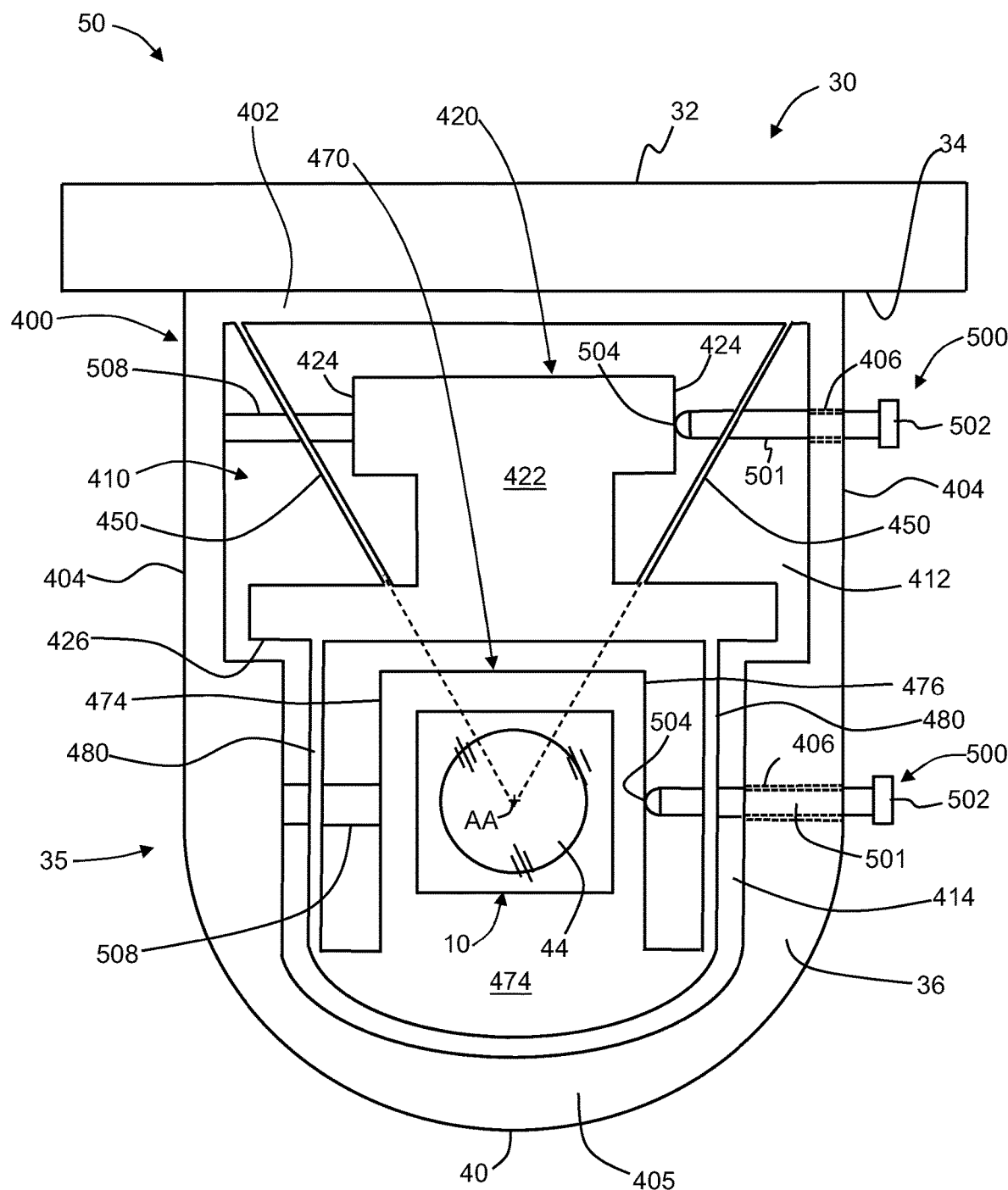
FIG. 7 is a front-on view of an example lens fixture that can be used to form the lens assembly, wherein the lens fixture is configured with flexures and adjusting screws that allow for the cylindrical lens to be rotationally and translationally adjusted within the lens fixture.

FIG. 7 is a front-on view of an example lens fixture 30 that can be used to form the lens assembly 50 and adjust the position of the cylindrical lens. The mounting section 35 of the lens fixture 30 is defined by a frame 400 having a top 402, opposite sides 404 and a curved bottom 405 that define an open interior 410. The open interior 410 has a top region 412 and a bottom region 414. The mounting section 35 includes a support member 420 suspended within the open interior 410. The support member 420 includes a top section 422 that resides in the top region 412 of the open interior 410 and a bottom section 474 that resides in the bottom section 414 of the open interior.

The support member 420 is suspended in the top region 412 of the open interior 410 by two angled support flexures 450 that downwardly depend from the top section 402 of the frame 400 and connect to the top section 422. The top support member 422 has opposite sides 424 and a bottom 426.

The bottom section 474 of the support member 420 is suspended in the bottom region 414 of the open interior 410 by two support flexures 480 that downwardly depend from the bottom 426 of the top section 422. The second section 474 has opposite sides 476 and includes the aperture 44 of the mounting section 35. An example cylindrical lens 10 is shown supported over the central aperture 44 to form the lens assembly 50. Dashed lines show how the angle support flexures 450 are configured so that if they were extended toward the bottom section 474 would intersect at the aperture axis AA of the aperture 44.

The adjustable lens fixture 30 further includes a first and second adjusting screws 500. The first adjusting screw 500 is supported by one side 404 of the frame 400 and includes a shaft 501 having a proximal end 502 and a distal end 504. At least a portion of the shaft 501 is threaded and engages a threaded hole 406 in the side 404. A portion of the shaft 501 also passes through a hole (not shown) in the corresponding angle support flexure 450 so that that distal end 504 contacts the corresponding side 424 of the first support member 420. The proximal end 502 can extend slightly beyond the frame 400 or can be flush with the frame and can be used for turning the first adjusting screw 500. A resilient member 508 is disposed between the side 404 of the frame 400 and the side 424 of the top section 422 of the support member 420 opposite to the first adjusting screw 500 to provide a stabilizing restoring force on the first support member.

The mounting fixture 30 also includes a second adjusting screw 500 also supported by the side 404 of the frame 400 so that the distal end 502 contacts the side 476 of the bottom section 474 of the support member 420. The shaft 501 of the second adjusting screw 500 passes through a hole (not shown) in the corresponding vertical support flexure 480. A resilient member 508 is disposed between the side 404 of the frame 400 and the side 476 of the bottom section 474 opposite to the second adjusting screw 500 to provide a stabilizing restoring force on the second support member.

The angled support flexures 450 allows for a rotation of the second section 474 about the aperture axis AA when the first adjusting screw 500 pushes horizontally on the top section 422. The vertical support flexures 480 allows for a translation of the bottom section 474 when the second adjusting screw 500 pushes horizontally on the bottom section. Providing the first and second adjusting screws 500 with fine threads allows for small (precision) rotational (azimuthal) adjustments with the first adjusting screw and small (precision) lateral adjustments using the second adjusting screw. In an example, the amounts of rotation of the first and second adjusting screws are respectively calibrated to the amounts of angular rotation and lateral translation of the cylindrical lens 10. Also in an example, the adjustment of the cylindrical lens 10 can be performed in real time while the lens assembly 50 resides within the system 100. Other types and configurations of lens fixtures 30 can be effectively employed as known in the art for adjusting the position of the cylindrical lens, and the example lens fixture shown in FIG. 7 and described above is provided as a non-limiting example.

Example of Measuring the Angular Position of a Positive Cylindrical Lens

Figure 8A:
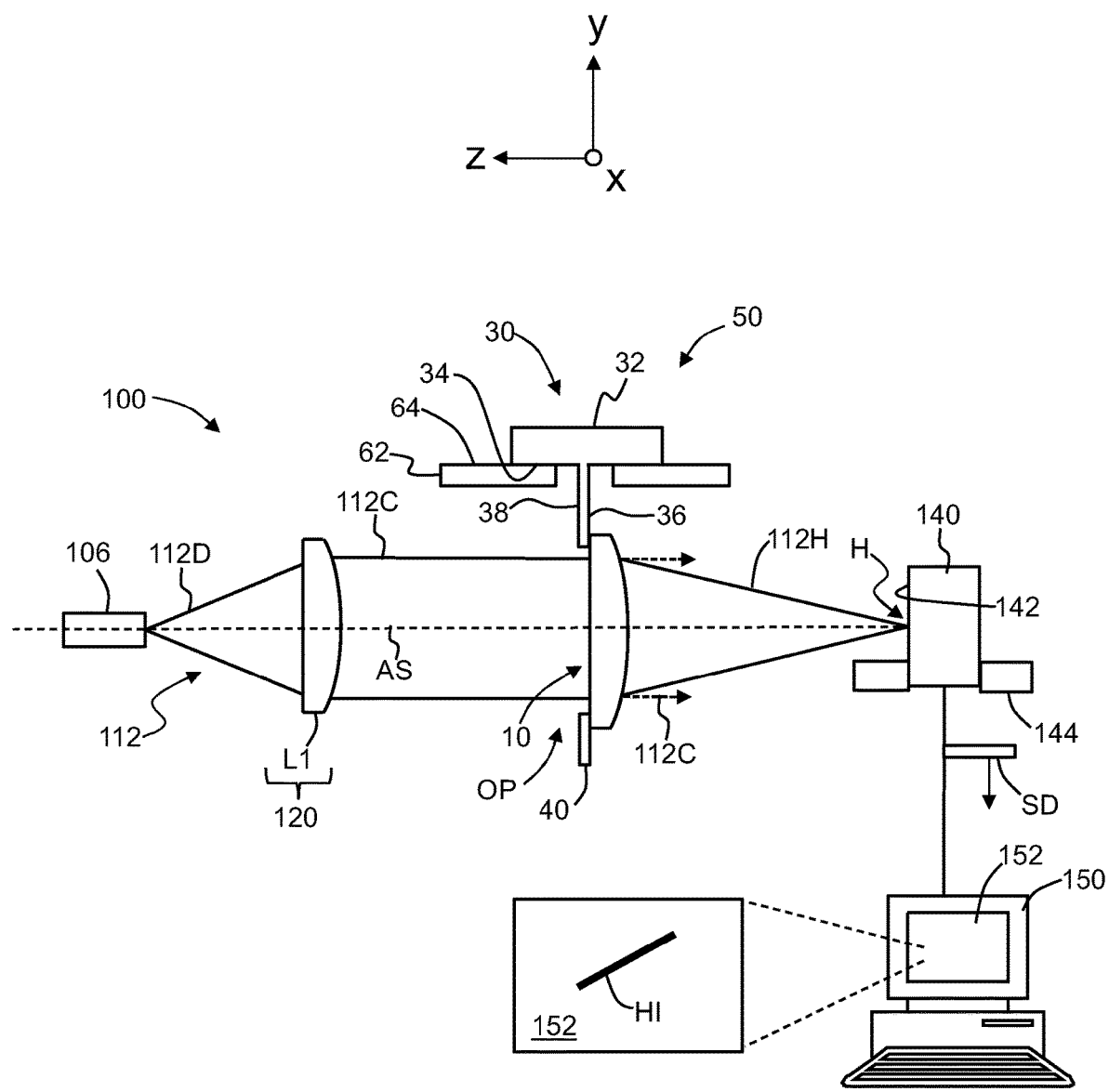
FIGS. 8A and 8B are similar to FIGS. 4B and 4C and illustrate an example of measuring the angular position of a positive cylindrical lens relative to the lens fixture using the measurement optical system of FIG. 4A.
Figure 8B:
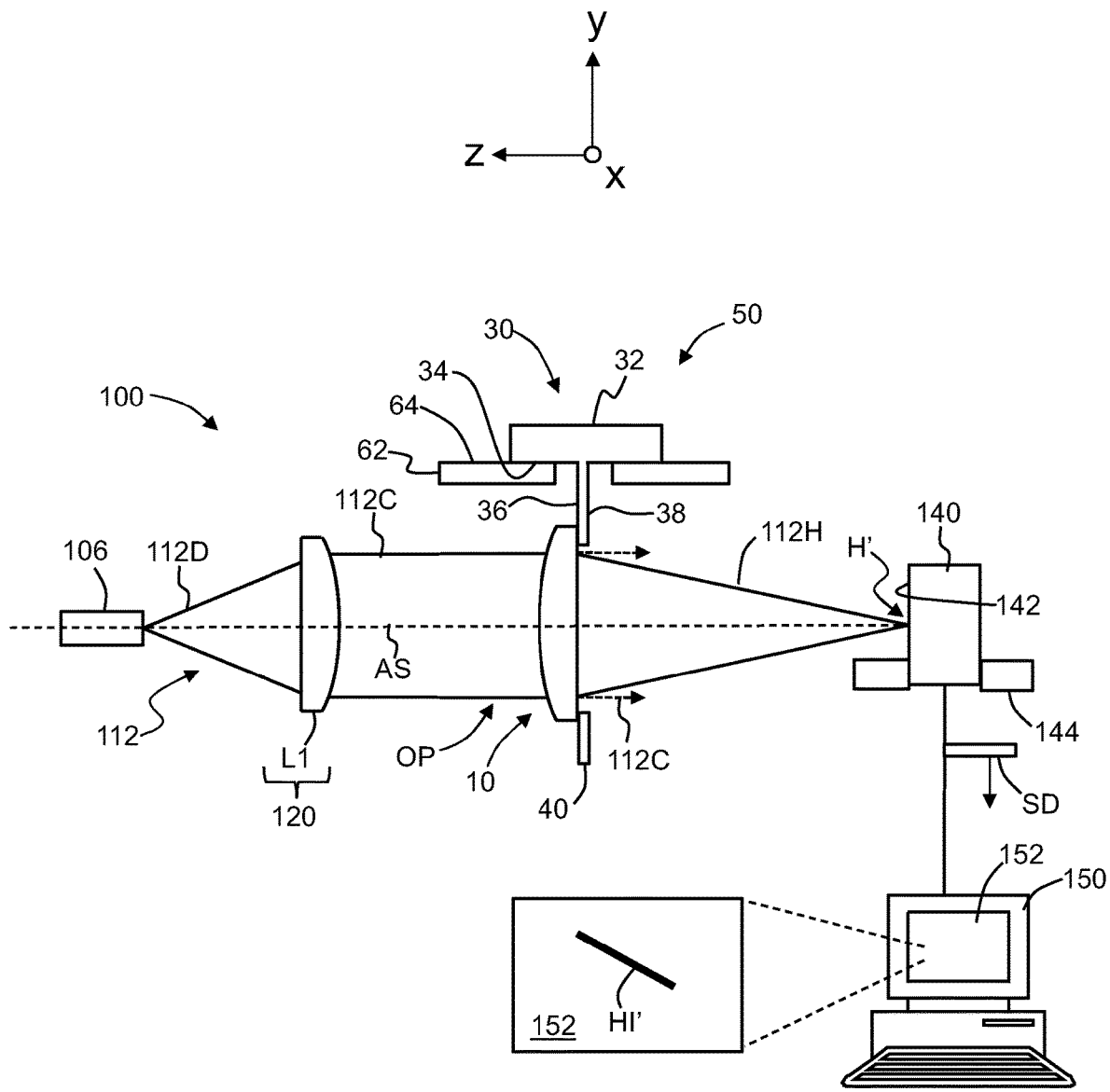

FIGS. 8A and 8B are similar to FIGS. 4B and 4C and illustrate an example embodiment of measuring the angular position of a positive cylindrical lens 10. In this embodiment, the optical system 120 includes only the collimating lens L1 to form the collimated light beam 112C. In FIG. 8A the positive cylindrical lens is in the "forward" operable orientation and forms the focused light beam 112H, which forms a first horizontal focus line H. The close-up inset of FIG. 8A shows the first horizontal line image HI. In this embodiment, there is no vertical focus line V in the orthogonal direction since the positive cylindrical lens is inserted into the collimated light beam 112C. An alternative embodiment is to use a weakly converging beam as shown in FIG. 4A.

FIG. 8B shows the lens assembly 50 flipped around so that the positive cylindrical lens 10 is now in its backward operably orientation that forms the second horizontal focus line H'. The close-up inset of FIG. 8B shows the second horizontal line image HI'.

Once the first and second horizontal line images H and H' are obtained, the bisecting line BL is optionally established and the method of measuring the angular misalignment and bringing the positive cylindrical lens to within the select alignment tolerance T proceeds as described above.

Example Optical System Using the Aligned Lens Assembly

Once the cylindrical lens 10 is aligned to the lens fixture 30, the resulting aligned lens assembly 50 can be added to an optical system that uses the cylindrical lens. The optical system includes a support structure like that of the support structure 60 so that cylindrical lens is mounted within the optical system in an aligned configuration, i.e., without having to make additional alignment measurements and adjustments.

Figure 9A:
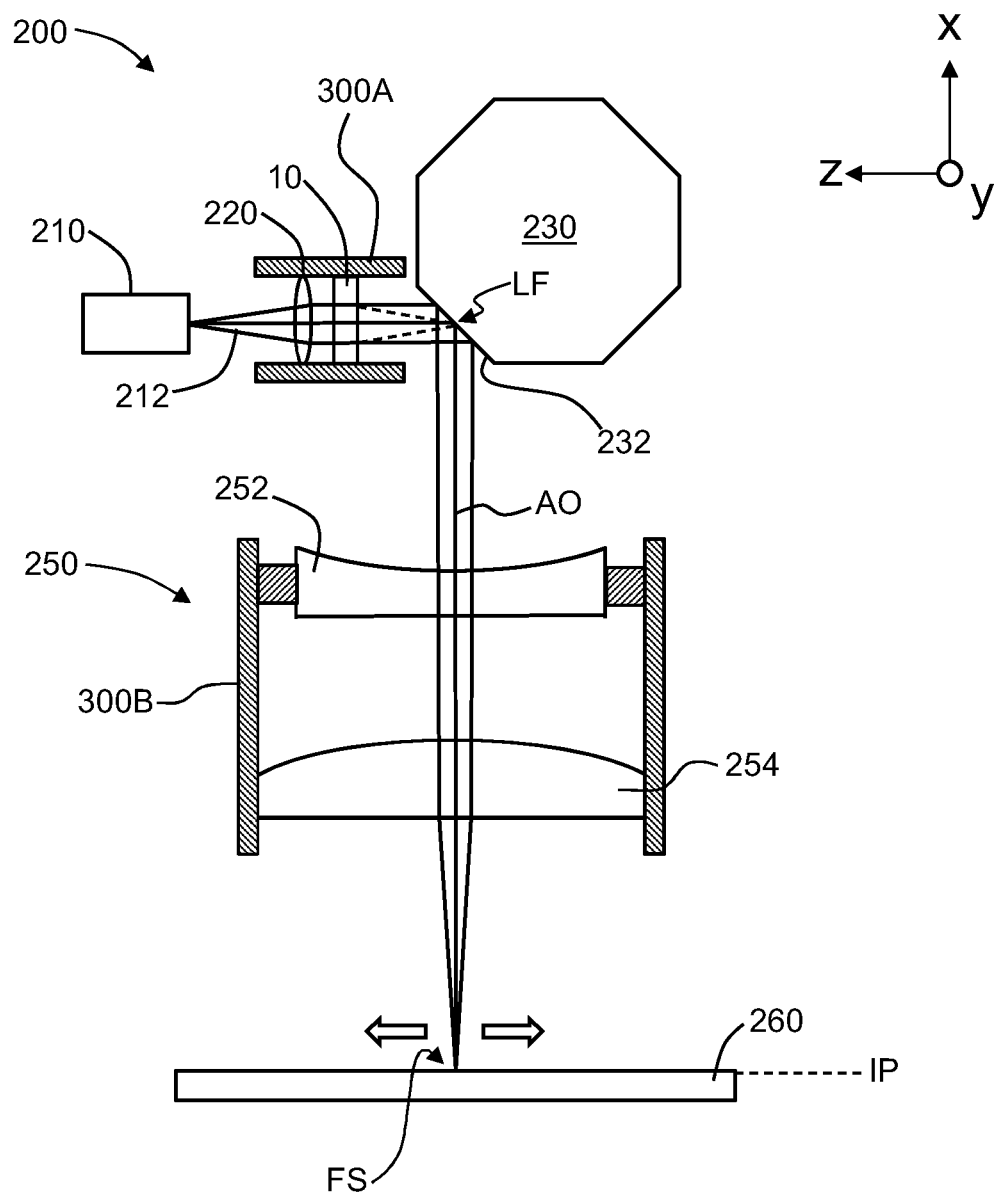
FIG. 9A is a schematic diagram of an example scanning optical system that employs a cylindrical lens element.

FIG. 9A is a schematic diagram of an F-θ scanning system ("scanning system") 200 as an example optical system that can employ the lens assembly 50 with the cylindrical lens 10 aligned to the mounting fixture 30 as described above. The scanning system 200 includes an optical axis AO, a light source 210, a collimating lens 220, a cylindrical lens 10, a rotating scanning mirror 230 with mirror facets 232, and an F-θ lens 250 shown as comprising a negative lens 252 and a positive lens 254, one or both of which can be anamorphic. The mirror facet 232 that rotates to intersect the optical axis AO acts to fold the optical axis and also move (scan) the optical axis as the rotatable mirror rotates. A workpiece 260 that resides in an image plane IP is also shown. Examples of the type of scanning system 200 of FIG. 8A are described in detail U.S. Pat. Nos. 5,031,979, 5,270,850 and 5,329,399, which are incorporated by reference herein.

The light source 210 emits diverging light, which is collimated by the collimating lens 220. The cylindrical lens 10 is used to form a line image at the facet 232 of the rotating scanning mirror 230, wherein the line image is narrow in the y-z plane and long in the x-z plane. The dashed line portion represents the imaging in the orthogonal y-z plane. The light reflects from the mirror facet 232 and is received by the F-θ lens 250, which focuses the light down to a focus spot FS at the image plane IP. The benefit of using the cylindrical lens 10 to form a line image at the mirror facet 232 is that it compensates for image shifts caused by misalignments in the mirror facets 232 due to imperfections in fabrication and alignment of the rotating scanning mirror 230. The result is a tilt-invariance effect that scans the focus spot FS over a desired scan path at the image plane IP during scanning.

The scanning system is shown as including a first lens barrel 300A that supports the collimating lens 220 and the cylindrical lens 10, and a second lens barrel 300B that supports the negative lens 252 and the positive lens 254 of the F-θ lens 250.

Figure 9B:
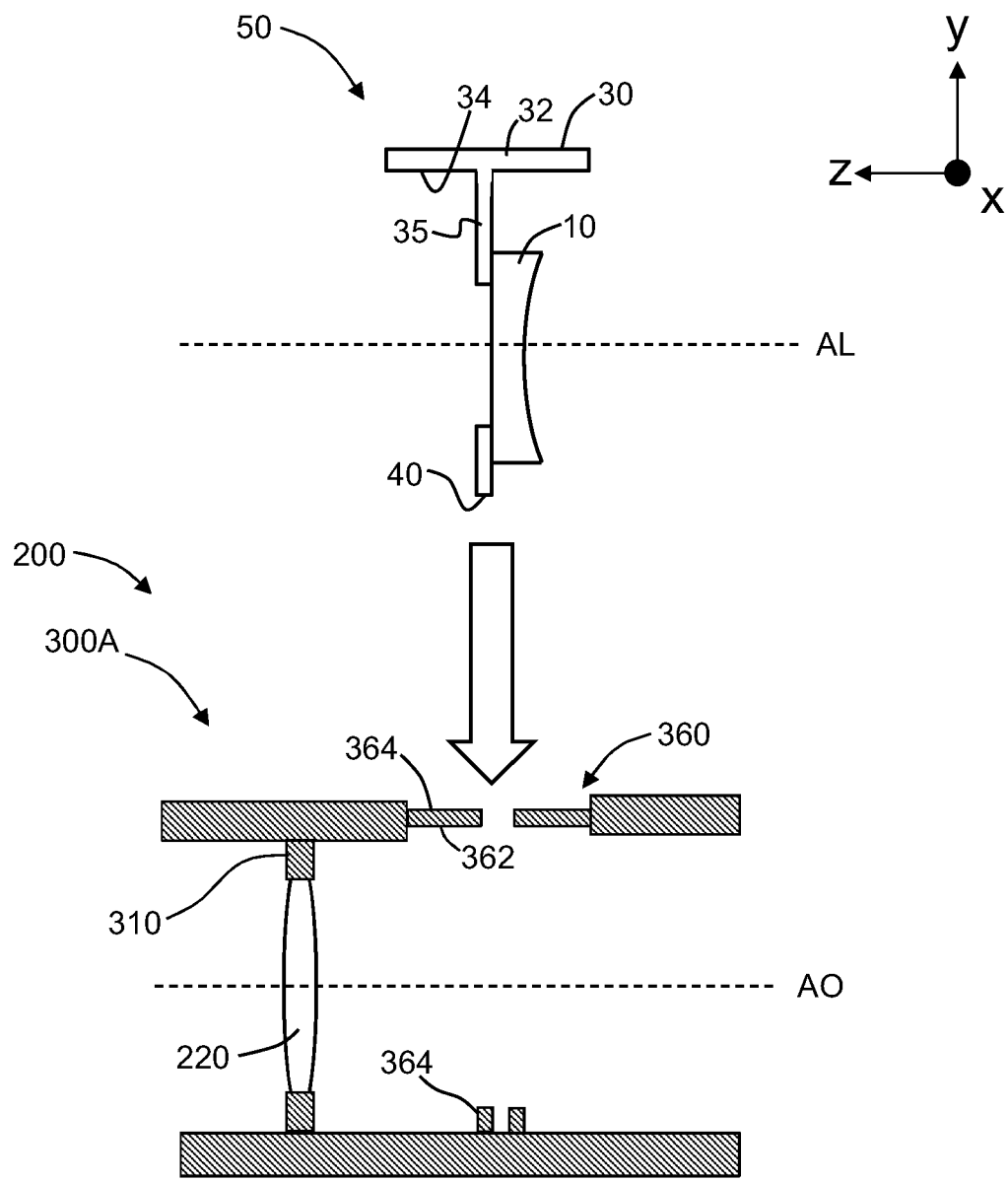
FIGS. 9B and 9C are close-up views of the first lens barrel illustrating how the lens assembly is interfaced with a support structure of the lens barrel so that the lens assembly is aligned within the scanning optical system.
Figure 9C:
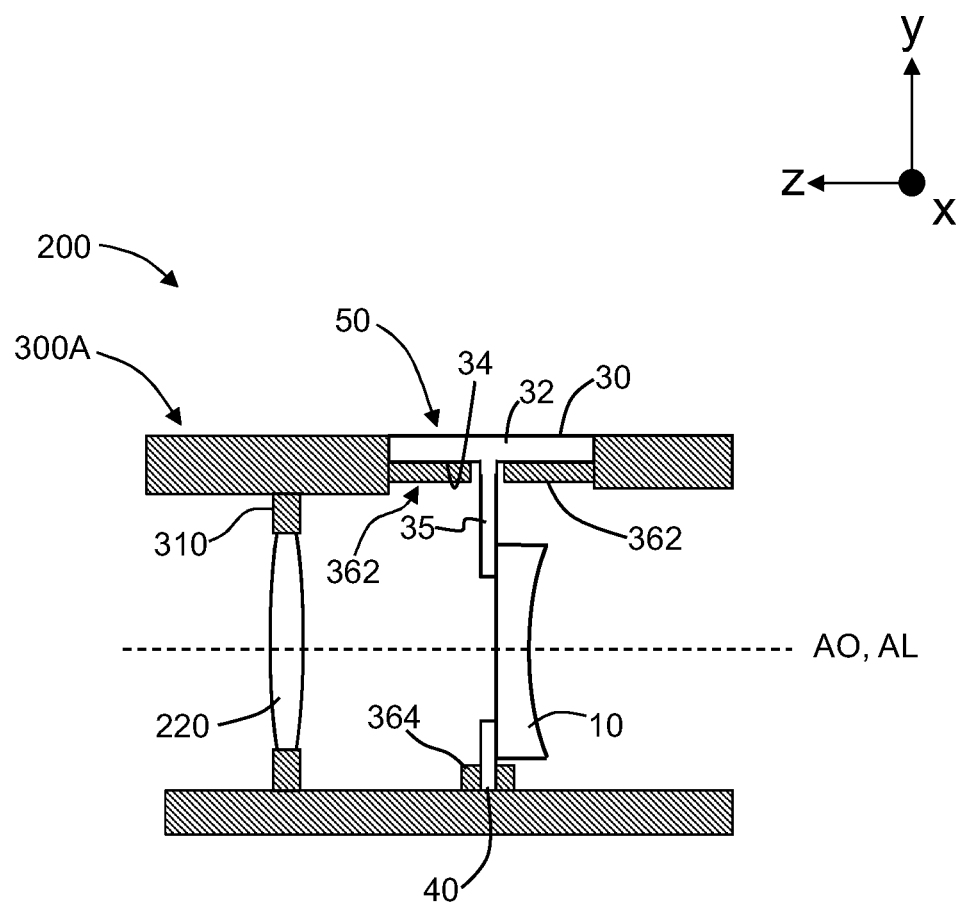

FIG. 9B is a close-up view of the first lens barrel 300A that supports the collimating lens 220 and the cylindrical lens 10. The lens barrel 300A includes a lens mount 310 for the collimating lens 220 and a support structure 360 for receiving and supporting the lens assembly 50, which includes the aligned cylindrical lens 10. The support structure 360 having a support member 362 with a support surface 364, which is preferably a precision surface. The support surface 364 defines a reference feature in the form of a mechanical datum. The support member 362 is configured so that the interface surface 34 of the lens fixture 30 interfaces with the support surface 364 of the support member, as shown in FIG. 9C. This aligns the lens assembly 50 within the lens barrel 300A, e.g., the cylindrical lens axis AL is aligned with the optical axis AO of the scanning system and also aligns the vertical and horizontal lens axes $Y_L$ and $X_L$ with the y and x axes of the optical system reference coordinate system of the optical system 200.

In an example, the support surface 364 of the support structure 360 is has the same or substantially the same configuration as the support surface 64 of the support structure 60 used in the measurement optical system 100. In an example, the support structure can include a support member 364 that secures the distal end 40 of the mounting section 35.

When the lens assembly 50 is operably supported in the lens barrel 300A using the support structure 360 such as shown in FIG. 9C, the reference feature 362 ensures that the cylindrical lens 10 is disposed in the scanning system 200 in an aligned manner, i.e., within the azimuthal rotation tolerance T relative to the corresponding y-axis (or other reference feature) of the scanning system 300. This alignment ensures the proper formation of the line focus LF at the mirror facet 232, which in turn ensures the proper formation of the scanned focus spot FS at the image plane IP.

Aspect 1 of the description is:
A method of forming a lens assembly, comprising:
adjustably attaching a cylindrical lens to a lens fixture having an interface surface;
interfacing the interface surface with a reference surface of a support structure, wherein the cylindrical lens can be placed in a frontwards and backwards orientation relative to a light beam, and wherein the reference surface defines a reference direction;
for the frontwards and backwards orientations, capturing respective first and second line images of respective first and second focus lines as formed by the cylindrical lens;
establishing a relative orientation of the first and second line images;
using the established relative orientations of the first and second line images, determining an amount of angular misalignment of the cylindrical lens relative to the reference direction; and
rotating the cylindrical lens relative to the lens fixture to reduce the amount of angular misalignment.

Aspect 2 of the description is:
The method according to Aspect 1, wherein the establishing of the relative orientation comprises determining a line that bisects the first and second line images.

Aspect 3 of the description is:
The method according to Aspect 1 or 2, further comprising after the rotating: securing the cylindrical lens to the lens fixture so that the cylindrical lens cannot rotate relative to the lens fixture.

Aspect 4 of the description is:
The method according to Aspect 3, wherein the cylindrical lens is adjustably attached to the lens fixture using a curable adhesive and wherein the securing comprises curing the curable adhesive.

Aspect 5 of the description is:
The method according to Aspect 4, wherein the curable adhesive is ultraviolet (UV) curable, and wherein curing the adhesive comprises irradiating the UV curable adhesive with UV radiation.

Aspect 6 of the description is:
The method according to any of Aspects 1-5, wherein the cylindrical lens has negative optical power and wherein the light beam comprises a converging light beam.

Aspect 7 of the description is:
The method according to any of Aspects 1-5, wherein the cylindrical lens has a plano surface.

Aspect 8 of the description is:
The method according to any of Aspects 1-5, wherein the cylindrical lens consists of a single cylindrical lens element.

Aspect 9 of the description is:
The method according to any of Aspects 1-5, wherein the cylindrical lens comprises at least two curved surfaces.

Aspect 10 of the description is:
The method according to any of Aspects 1-5, wherein the cylindrical lens comprises a first cylindrical surface and a second spherical or aspherical surface.

Aspect 11 of the description is:
The method according to any of Aspects 1-5, wherein the cylindrical lens has a first curved surface that resides in a first plane and wherein the first and second line focuses reside in a second plane orthogonal to the first plane when there is no angular misalignment of the cylindrical lens.

Aspect 12 of the description is:
The method according to any of Aspects 1-5, wherein the cylindrical lens has a first curved surface that resides in a first plane and wherein the first and second line focuses reside in a second plane parallel to the first plane when there is no angular misalignment of the cylindrical lens.

Aspect 13 of the description is:
The method according to any of Aspects 1-5, where the cylindrical lens has a curved surface having radius of curvature R, wherein |R|>1500 mm.

Aspect 14 of the description is:
The method according to any of Aspects 1-13, further comprising inserting the lens assembly into an optical system by interfacing the lens fixture with a second support structure of the optical system.

Aspect 15 of the description is:
The method according to Aspect 14, wherein the interfacing comprising contacting the interfacing surface with a second reference surface of the second support structure.

Aspect 16 of the description is:
The method according to any of Aspects 1-5, wherein the cylindrical lens has a negative optical power and further comprising forming the first and second focus lines by directing a converging light beam through the cylindrical lens.

Aspect 17 of the description is:
The method according to any of Aspects 1-16, wherein the lens fixture comprises a mounting section having flexures, and wherein said rotating of the cylindrical lens is performed by moving the flexures.

Aspect 18 of the description is:
The method according to Aspect 17, wherein the flexures are connected to a support member and the moving of the flexures is performed by pushing the flexures against the support member using an adjusting screw.

Aspect 19 of the description is:
The method of any of Aspects 1-18, wherein the rotating reduces the amount of angular misalignment to be within an angular alignment tolerance, the angular alignment tolerance being less than 1 milliradian.

Aspect 20 of the description is:
A method of measuring the rotational position of a cylindrical lens relative to a lens fixture to which the cylindrical lens is adjustable attached, comprising:
interfacing the lens fixture with a reference feature in first and second measurement positions in which the cylindrical lens is respectively disposed in a frontward orientation and a backward orientation;
for each of the first and second measurement positions, forming first and second line focuses and capturing first and second line images of the first and second line focuses, respectively;
establishing a relative orientation of the first and second line images; and using the established relative orientation to determine the rotational position of the cylindrical lens relative to the lens fixture.

Aspect 21 of the description is:
The method according to Aspect 20, wherein the establishing of the relative orientation of the first and second line images comprises defining a bisecting line that bisects the first and second line images.

Aspect 22 of the description is:
The method according to Aspect 20 or 21, further comprising:
rotating the cylindrical lens relative to the lens fixture to adjust the rotational position to be within a rotational position tolerance.

Aspect 23 of the description is:
The method according to Aspect 22, wherein the rotational position tolerance is 1 milliradian.

Aspect 24 of the description is:
The method according to Aspect 22 or 23, further comprising after the rotating:
securing the cylindrical lens to the lens fixture so that the cylindrical lens cannot rotate relative to the lens fixture.

Aspect 25 of the description is:
The method according to Aspect 24, wherein the cylindrical lens is adjustably attached to the lens fixture using a curable adhesive and wherein said securing comprises curing the curable adhesive.

Aspect 26 of the description is:
The method according to any of Aspects 20-26, wherein the lens fixture comprises a mounting section having flexures, and wherein said rotating of the cylindrical lens is performed by moving the flexures.

Aspect 27 of the description is:
The method according to Aspect 26, wherein the flexures are connected to a support member and the moving of the flexures is performed by pushing the flexures against the support member using an adjusting screw.

Aspect 28 of the description is:
The method according to any of Aspects 20-27, wherein the cylindrical lens has a plano surface.

Aspect 29 of the description is:
The method according to any of Aspects 20-27, wherein the cylindrical lens consists of a single cylindrical lens element.

Aspect 30 of the description is:
The method according to any of Aspects 20-27, wherein the cylindrical lens comprises at least two curved surfaces.

Aspect 31 of the description is:
The method according to any of Aspects 20-27, wherein the cylindrical lens comprises a first cylindrical surface and a second spherical or aspherical surface.

Aspect 32 of the description is:
The method according to any of Aspects 20-27, where the cylindrical lens has a curved surface having radius of curvature R, wherein |R|>1500 mm.

Aspect 33 of the description is:
The method according to any of Aspects 20-27, wherein the cylindrical lens has a negative optical power and further comprising forming the first and second focus lines by directing a converging light beam through the cylindrical lens.

Aspect 34 of the description is:
The method according to any of Aspects 20-33, wherein the reference feature comprises a support surface of a support structure.

Aspect 35 of the description is:
The method according to any of Aspects 20-34, further comprising inserting the lens assembly into an optical system by interfacing the lens fixture with a second support structure of the optical system.

Aspect 36 of the description is:
The method according to Aspect 35, wherein the interfacing comprising contacting an interfacing surface of the lens fixture with a reference surface of the second support structure.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a lens assembly, comprising:
adjustably attaching a cylindrical lens to a lens fixture having an interface surface and a reference direction for measuring an alignment orientation of the cylindrical lens relative to the lens fixture;
interfacing the interface surface with a reference surface of a support structure in two different orientations, namely a frontwards orientation and a backwards orientation, wherein the lens fixture is placed in the support structure in the frontwards orientation and then in the backwards orientation or vice versa relative to a light beam traveling over an optical path that passes through the cylindrical lens in each of the two different orientations;
for the frontwards and backwards orientations, capturing respective first and second line images of respective first and second focus lines as formed by the cylindrical lens altering the optical path of the light beam in first and second ways;
establishing a relative orientation of the first and second line images using a bisecting line that bisects the first and second line images at a bisecting angle that is the same for the first and second line images;
determining an amount of angular misalignment of the cylindrical lens relative to the reference direction of the lens fixture as the bisecting angle; and
rotating the cylindrical lens relative to the lens fixture in a rotation direction that reduces the amount of angular misalignment.

2. The method according to claim 1, wherein the capturing of the first and second line images is performed using an axially moveable image sensor.

3. The method according to claim 1, further comprising after the rotating:
securing the cylindrical lens to the lens fixture so that the cylindrical lens cannot rotate relative to the lens fixture.

4. The method according to claim 1, wherein the cylindrical lens has negative optical power and wherein the light beam comprises a converging light beam.

5. The method according to claim 1, wherein the cylindrical lens has a plano surface.

6. The method according to claim 1, wherein the cylindrical lens comprises a first cylindrical surface and a second spherical or aspherical surface.

7. The method according to claim 1, wherein the cylindrical lens has a first curved surface that resides in a first plane and wherein the first and second focus lines reside in a second plane orthogonal to the first plane when there is no angular misalignment of the cylindrical lens.

8. The method according to claim 1, wherein the cylindrical lens has a first curved surface that resides in a first plane and wherein the first and second focus lines reside in a second plane parallel to the first plane when there is no angular misalignment of the cylindrical lens.

9. The method according to claim 1, where the cylindrical lens has a curved surface having radius of curvature R, wherein |R|>1500 mm.

10. The method according to claim 1, wherein the interface surface and the reference surface comprise respective precision surfaces.

11. The method of claim 1, wherein the rotating reduces the amount of angular misalignment to be within an angular alignment tolerance, the angular alignment tolerance being less than 1 milliradian.

12. A method of forming a lens assembly, comprising:
a) adjustably attaching a cylindrical lens to a lens fixture having an interface surface and a reference direction for measuring an alignment orientation of the cylindrical lens relative to the lens fixture;
b) interfacing the interface surface of the lens fixture with a reference surface of a support structure so that the lens fixture and the cylindrical lens face in a first direction, directing a light beam through the cylindrical lens to form a first focus line and capturing a first line image of the first focus line;
c) turning the lens fixture around by 180 degrees from the first direction and then interfacing the interface surface of the lens fixture with a reference surface of the support structure so that the lens fixture and the cylindrical lens face in a second direction opposite the first direction, directing the light beam through the cylindrical lens to form a second focus line and capturing a second line image of the second focus line;
using a bisecting line to bisect the captured first and second line images to determine a bisecting angle that represents an amount of angular misalignment of the cylindrical lens relative to the reference direction of the lens fixture;
rotating the cylindrical lens relative to the lens fixture in a rotation direction that reduces the amount of angular misalignment; and
securing the cylindrical lens to the lens fixture after said rotating.

13. The method according to claim 12, wherein said adjustably attaching is performed using a curable securing material and wherein said securing is performed by curing the curable securing material.

14. The method according to claim 12, wherein the interface surface and the reference surface comprise respective precision surfaces.

15. The method according to claim 12, wherein the cylindrical lens has negative optical power and wherein the light beam comprises a converging light beam.

16. The method according to claim 12, wherein the cylindrical lens has positive optical power and wherein the light beam comprises either a collimated light beam or a diverging light beam.

17. The method according to claim 12, wherein capturing the first and second line images comprises capturing the first line image using an image sensor positioned at a first axial location and wherein the second line image is captured by moving the image sensor to a second axial position.

* * * * *

UNITED STATES PATENT AND TRADEMARK OFFICE
CERTIFICATE OF CORRECTION

| | |
|---|---|
| PATENT NO. | : 11,280,978 B2 |
| APPLICATION NO. | : 16/582036 |
| DATED | : March 22, 2022 |
| INVENTOR(S) | : Michael Morgan Dunn et al. |

It is certified that error appears in the above-identified patent and that said Letters Patent is hereby corrected as shown below:

On the Title Page

Item (56), page 2, in Column 2, under "Other Publications", Line 2, delete "(2019." and insert -- (2019). --.

Signed and Sealed this
Twenty-first Day of June, 2022

Katherine Kelly Vidal
*Director of the United States Patent and Trademark Office*